United States Patent [19]

Tannenbaum et al.

[11] Patent Number: 5,720,020
[45] Date of Patent: Feb. 17, 1998

[54] HARDWARE BASED GRAPHICS WORKSTATION SOLUTION FOR REFRACTION PHENOMENA

[75] Inventors: David Conrad Tannenbaum, Hurley; Andrew David Bowen, Saugerties; Jeffrey Scott Spencer, Hurley, all of N.Y.

[73] Assignee: International Business Machines Corporation, Armonk, N.Y.

[21] Appl. No.: 522,798

[22] Filed: Sep. 1, 1995

Related U.S. Application Data

[63] Continuation of Ser. No. 192,323, Feb. 4, 1994, abandoned.
[51] Int. Cl.$^6$ .............................. G06T 3/20; G06T 15/00
[52] U.S. Cl. ............................................ 395/135; 395/138
[58] Field of Search ................................. 395/119, 126, 395/130, 131, 135, 138

[56] References Cited

U.S. PATENT DOCUMENTS

| | | | |
|---|---|---|---|
| 5,224,208 | 6/1993 | Miller, Jr. et al. | 395/130 X |
| 5,280,570 | 1/1994 | Jordan | 395/135 |

OTHER PUBLICATIONS

Computer Graphics: Principles and Practice, 2nd Ed; Foley, van Dam, Feiner, Hughes; Addison–Wesley Publishing Co; (1990) pp. 13,471–476,584–587,673,738,757,776–782, 843+.

Eurographics '89, 1989, "Pixel Selected Ray Tracing", Akimoto et al, pp. 39–50.

Computer Graphics Forum, 1992, vol. 11, No. 4, "Consistent Schemes for Addressing Surfaces when Ray Tracing Transparent CSG Objects", Gervautz, M., pp. 203–211.

8078 Proceeding of the IEEE, Apr. 1991, "Massively Parallel Computational Simulations in Light Scattering", Potter et al, pp. 567–573.

IBM Journal of Research and Development, Jan./Mar. 1991, "Visualization of Molecular Dynamics via Ray–Tracing and Animation in a Vectorized Environment", Williams et al, pp. 108–118.

Primary Examiner—Mark K. Zimmerman
Attorney, Agent, or Firm—Mark S. Walker

[57] ABSTRACT

A system and method for drawing non-opaque objects with realistic refraction attributes. The system adjusts the pixel values of an object with a refraction index other than unity so that the resulting image approximates a refracted image. Adjacent pixel values are copied and blended with the pixel being rendered based upon a calculated refraction value. Refraction can be approximated as a surface effect by offset vectors, as a property of an object having parallel front and back surfaces and as an arbitrary object with non-parallel opposing surfaces. The more complex representations provide improved approximations of the refracted image. The resulting image presents a more realistic view of the refracted image.

8 Claims, 5 Drawing Sheets

HARDWARE BASED GRAPHICS WORKSTATION SOLUTION FOR REFRACTION PHENOMENA

This is a continuation of application Ser. No. 08/192,323 filed Feb. 4, 1994, now abandoned.

BACKGROUND OF THE INVENTION

1. Field of the Invention

The present invention relates to apparatus for generating graphics images of objects. More particularly, it relates to computer graphics systems for portraying three dimensional objects as two dimensional images on a display surface. Still more particularly, the present invention relates to graphics systems for rendering non-opaque three dimensional objects having an index of refraction other than unity.

2. Background of the Invention

Many naturally occurring, non-opaque materials have a non-unity index of refraction. This in turn leads to the bending of light transmitted through these objects. In computer graphics non-opaque materials are approximated by the use of alpha blending. The colors seen through transmitting materials are a combination of the object's color and the color previously in the flame-buffer at the corresponding pixel.

This limited model restricts the index of refraction to unity and causes computer generated transparent objects to deviate from reality in most cases. To properly render the image seen through an optically dense material requires fetching pixels from surrounding places on the screen based on the geometric and physical properties of the transmitting material.

We provide an apparatus and algorithm whereby both optically rare and optically dense non-opaque media can be approximated by a raster subsystem. Modeling the refraction process exactly is beyond the scope of the current invention—an approximation is provided herein. For an in-depth discussion of refraction processes at the electromagnetic theory level, refer to *Principles of Optics* Born, Max and Emil Wolf, Sixth edition, Pergamon Press, 1980. Specifically, the present invention considers homogeneous, isotropic, dielectric media such as glass.

Refraction has never been addressed in a conventional hardware raster graphics system. In the past refraction has been accomplished as part of the ray tracing global illumination algorithm. See, for example, *Computer Graphics—Principles and Practice*, Foley, James D., Andries van Dam, Steven K. Feiner, and John F. Hughes, Second edition, Addison-Wesley Publishing Co., Reading Mass., 1990 or *An Introduction to Ray Tracing*, Edited by Andrew S. Glassner, Academic Press, Ltd., 1989.

BACKGROUND PHYSICS AND MATHEMATICS

Refraction is an optical phenomenon that occurs when light passes through a medium of one optical density into a medium of another optical density. The change in optical density causes a change in the velocity of light which leads to a bending of the direction of propagation.

FIG. 6 depicts geometrically the bending of the ray vector that occurs when refraction is present. Vector 602 is incident upon the material interface 601 with an angle of incidence $\theta_i$ with respect to the normal vector 603. The transmitted vector 604 forms an angle $\theta_t$ with respect to the inward oriented normal. Snell's law, equation (1), provides the relationship between the angle of incidence and the angle of transmission for the idealized situation presented.

$$\frac{\sin(\theta_i)}{\sin(\theta_t)} = \frac{\eta_t}{\eta_i} \quad (1)$$

Air has an index of refraction near unity. Different varieties of glass and plastics can have indices of refraction ranging from just above unity to 2 or 3. Values for the index of refraction for common materials can be found in *CRC Handbook of Chemistry and Physics*, 1st Student Edition, Edited by Robert C. Weast, CRC Press, Inc. 1988.

A more complete diagram of transmission is depicted in FIG. 7. Here a transmitting plate of thickness d is shown with index of refraction qt. As in FIG. 6, Incident ray 702 arrives at an incident angle $\theta_i$. Transmitted ray 704 forms an angle $\theta_t$. Upon reaching the bottom surface of the slab the transmitted ray is again refracted and becomes parallel to the initial incident ray as 706. This scenario occurs when two conditions are met: the two surfaces of the plate are parallel; and the index of refraction of the materials on either side of the plate are identical, as, for example, a plate enveloped by air. When the two surfaces of the object are not parallel, the rays 702 and 706 are no longer, in general, parallel.

In the general case, when a ray strikes a surface the reflected and transmitted ray directions can be computed by solving Maxwell's equations and by imposing certain boundary conditions for continuity. However, a simple geometric approach is sufficient for the present invention.

For transparent media, the vector for the transmitted ray is, $$\vec{T} = \eta_{it}\vec{I} + \left(\eta_{it}\cos(\theta_i) - \sqrt{1 + \eta_{it}^2[\cos^2(\theta_i) - 1]}\right)\vec{N} \quad (2)$$

Where, $\theta_i$ is the angle between the incident ray and the normal vector.

$\eta_{it}$ is the ratio of the index of refraction for the material containing the incident ray with respect to the index of refraction for the material containing the transmitted ray, i.e., the ratio: $\eta_i/\eta_t = \eta_{it}$.

$\vec{I}$ unit incident vector towards point of intersection $\vec{N}$ unit outwardly sensed normal vector T unit transmitted vector away from the point of intersection into the material.

Note: Total internal reflection occurs when the argument of the radical in the equation for the transmitted ray vector is negative causing a complex coefficient for $\vec{N}$ The index of refraction need not be a real quantity. A complex index of refraction indicates a degree of absorption, the imaginary component corresponding to the absorption exponent. Absorption by a transmitting medium is accounted for by approximating the exponential function, $e^{-\eta_i d}$ which is then used in place of alpha ($\eta_i$ is the imaginary component of the index of refraction supplied as input, and d is the thickness of the object as determined by the difference in coordinates at the front and back surface intersections as shown, for example, in FIG. 4.) The result is to exponentially decrease the intensity transmitted through the sample based on its thickness. The present invention is directed to providing three alternate solutions to accurately representing refracted images. Because the first solution considers a single surface only, this attenuation term, $e^{-\eta_i d}$, is necessarily applied only to the second and third solutions.

The following solution is an improvement over the current art of hardware rasterizers because it approximates the refraction phenomenon. In other graphics hardware refraction is totally ignored. Previous solutions to this problem have been entirely in software and therefore could not operate at real-time rates.

The quality of an image subject to refraction phenomenon is readily apparent by viewing the resulting image. The well-known effect of a ruler appearing "broken" when viewed partially submerged in a glass of water is an everyday example of refraction. (See FIG. 8.) Existing ray tracing methods are able to accurately represent refracted images, but only at the expense of poor performance. Ray tracing is an extremely computationally intensive operation; accounting for refraction using ray tracing noticeably slows drawing performance.

SUMMARY OF THE INVENTION

The current invention consists of two parts. The first is a mechanism for moving pixel data from one arbitrary position to another under per pixel control and can be thought of as a data-driven screen-to-screen copy mechanism. For a given pixel, a copy is made from a surrounding pixel based on the data of that given pixel.

The second part of the invention comprises means for determining what pixel motion is appropriate to best approximate the refraction phenomenon. This part provides input to control the source and destination of pixel data. The remainder of the discussion focuses on the second part.

Movement of pixel data is required to account for the bending of the light as it passes through the refractive material. The image generated is no longer formed by the pixels directly "behind" the surface (i.e. along the same viewing vector at a greater Z depth.) The refracted image includes pixels at a greater Z depth but offset in the X and Y dimensions due to the refraction phenomenon. The pixel data to be blended into the image at a particular display position (X,Y) is located by tracing an offset vector along the Z dimension until it intersects displayable pixel data.

The mechanism for obtaining the correct Z data from the frame buffer for comparison with the interpolated Z is simplest in a system with a single raster pipeline as shown in FIG. 2. In this case the memory controller has access to all pixels in the frame buffer and can directly read the Z buffer at the address defined by X,Y representing the new interpolated Z location. This is also the case for parallel raster systems designed with a crossbar matrix between the memory controllers for each of the rasterizers and the frame buffer. The memory controller for each pipeline can access any location of the Z buffer requested by the refraction solution used. For parallel raster systems whose memory controllers are hard-wired to the frame buffer (i.e. without a crossbar matrix), the mechanism for accessing a Z buffer value becomes dependent on the frame buffer organization. In any case, however, each of the parallel raster pipelines must be able to communicate with the other pipelines or there must be a central mechanism in which data can be exchanged between the parallel pipeline.

The present invention is directed to a system for generating a two dimensional representation of a plurality of three dimensional objects, at least one of the plurality of objects being a refractive object having a non-unity index of refraction. The system comprises means for generating an offset vector based on the index of refraction, and means for rendering the refractive object by determining for each pixel position of the refractive object a modification to the current pixel value by a second pixel value at a second pixel position offset from the current pixel position as a function of the offset vector.

It is therefore one object of the present invention to provide an improved method and apparatus for the realistic graphical display of three-dimensional data.

It is another object of the present invention to admit transparent media into the class of primitives supported by a graphical rendering system.

It is yet another object of the present invention to approximate refraction phenomena when rendering transparent objects.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein like numbers refer to like objects:

FIGS. 3a–3d present a comparison of rendering a triangle with and without the current invention. FIG. 3a represents prior art.

DETAILED DESCRIPTION OF PREFERRED EMBODIMENT

Figure 1:
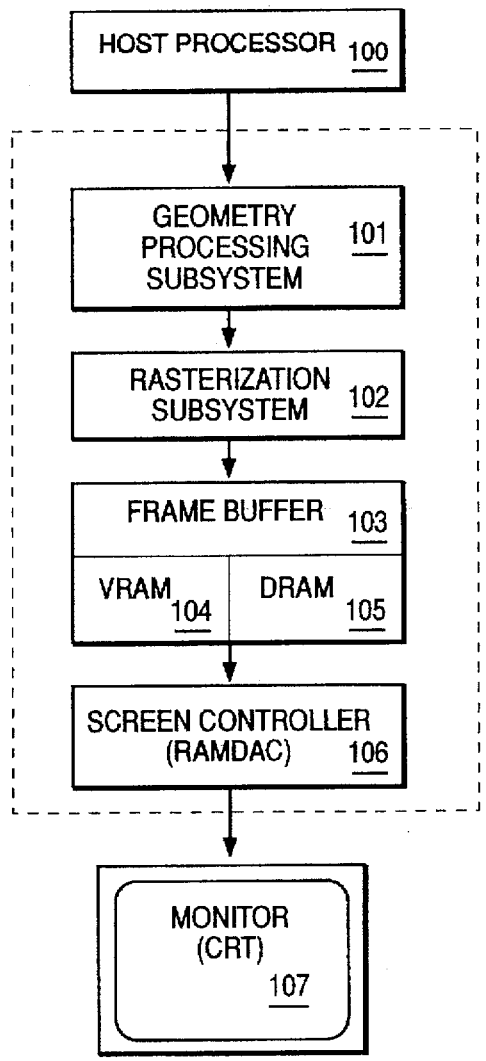
FIG. 1 depicts the general architecture of a graphics adapter system.

Consider the graphics system depicted in FIG. 1. The system consists of host processor 100 which sends graphics orders to geometry processing subsystem 101. The geometry processor 101 can also be contained as part of the function performed by host processor 100 and need not be a physically or logically separate entity. In the preferred embodiment rasterization subsystem 102 receives a stream of primitives. The subset of this stream relevant to the current invention consists of vertices defining triangles. The extensions to the data stream for the current invention are elaborated on below.

Upon processing of the data stream, rasterization subsystem 102 produces a plurality of pixels which are then sent to frame buffer 103, the displayable portion of a pixel is typically directed to video random access memory (VRAM) 104 and the non-displayable portion destined for Z-buffers, stencil buffers, etc., to dynamic random access memory (DRAM) 105. RAMDAC 106 receives serially scanned data from VRAM 104 and converts the digital data into the analog control signals used by CRT monitor 107.

Figure 2:
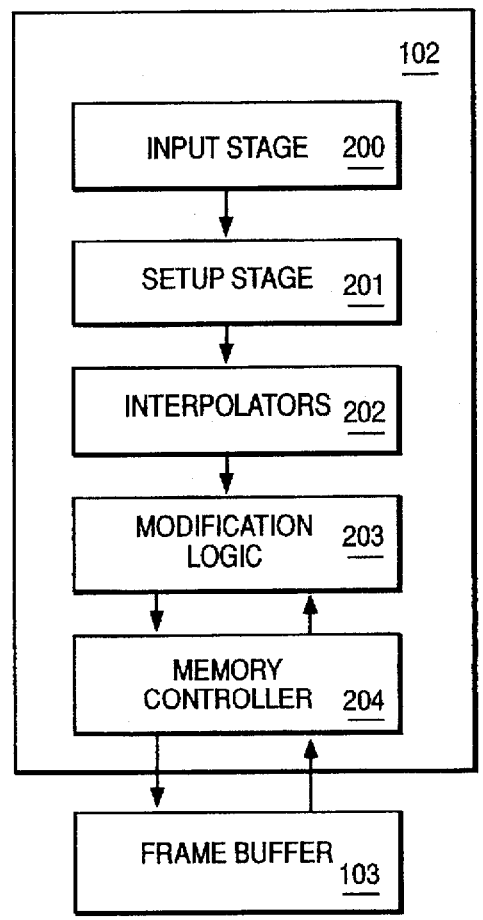
FIG. 2 depicts in more detail the rasterizer of FIG. 1.

The preferred embodiment of the current invention is part of rasterization subsystem 102. FIG. 2 illustrates details of the rasterization subsystem. An input stage 200 receives data from geometry processor 101 and handles any inter-subsystem protocols for communication. Setup stage 201 computes the partial products used in the triangle interpolation algorithm. This may include the components of an offset vector as part of the current invention. Interpolators 202 are responsive to partial products supplied by setup stage 201 and product a plurality of pixels to be operated on by modification logic 203. The offset vector is a new concept introduced as part of the current invention and is discussed below. Modification logic 203 performs fragment operation, e.g., Boolean operations, blends, and Z comparisons. Memory controller 204 acts as an interface between rasterization subsystem 102 and frame buffer 103 producing the standard control signals for the plurality of VRAM 104 and DRAM 105 modules that comprise frame buffer 103.

In the depicted embodiment we have shown a very large scale integration (VLSI) based solution. Other embodiments are contemplated including processor assist based solutions. For example, a general purpose processor can be connected to rasterization subsystem 102 to perform one or more of the tasks assigned to blocks in FIG. 2. The relative merits of a processor based system over the VLSI intensive approach are the added flexibility and generality. To reduce clutter and complexity in the figures, we have chosen to illustrate using only the VLSI intensive approach.

Having established the context of the current invention, we propose several alternate embodiments implementing alternate solutions in which trade-offs between speed, accuracy and system resources are made. The physics underlying refraction phenomena are explained in the references cited in the physics background section, supra.

First solution (fastest performance, least accuracy)

Figure 3B:
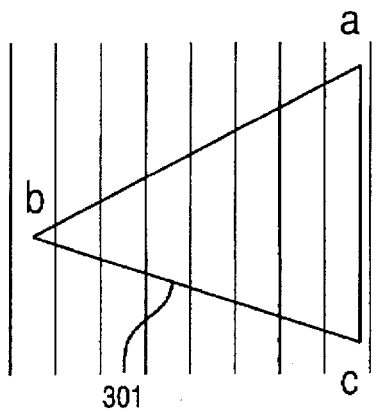
Figure 3B:
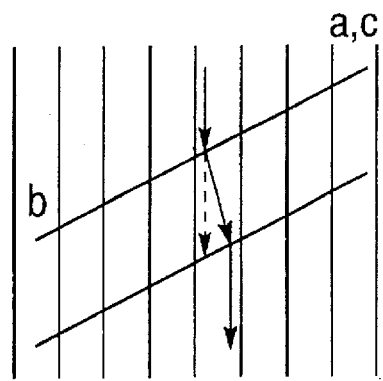
Figure 3D:
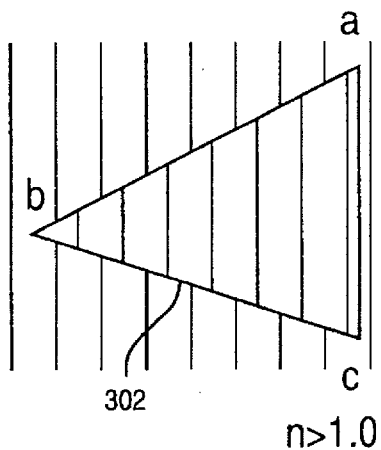
Figure 3D:
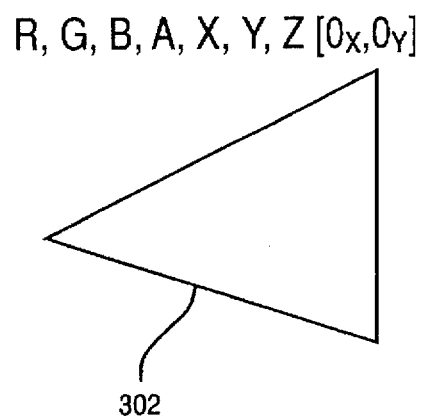
Figure 6:
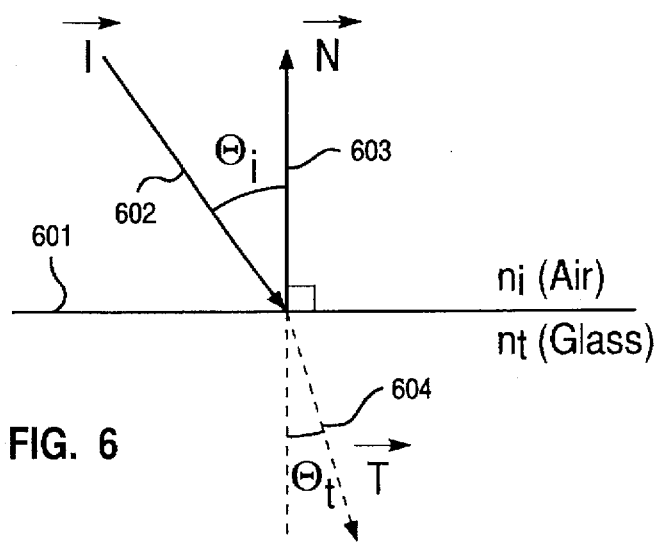
FIG. 6 presents the relevant geometry for refraction occurring at an air/glass interface.

With this algorithm, a transparent material is approximated as a single surface. Thus, all refraction phenomena are lumped into a surface boundary effect. In FIG. 3 two versions of the same triangular patch of a transparent object are shown positioned over a striped reference background. The generation of the image of triangle 30t in FIG. 3a drawn by prior art methods is shown based on an index of refraction of unity. In FIG. 3c, the stripes seen through triangle 302 are displaced in response to a non-unity index of refraction of triangle 302 as made possible by the current invention. FIG. 3b depicts a side view of the situation as exists with a non-unity index of refraction. Rays are bent as a result of the refraction. The data associated with one vertex of triangle 302 is listed in FIG. 3d.

Geometry processor 101 sends to rasterization subsystem 102 the coordinates of the triangle including, nominally, the color as an RGB triple, the transparency alpha (A), and the positional data X,Y,Z. Additionally, associated with each vertex a, b, and c of triangle 302, (specifically as part of the current invention), is an offset vector, $[O_x, O_y]$. These three offset vectors (one per vertex) are interpolated over the area of the triangle in the same fashion as are vertex normal vectors for Phong shading. At a particular pixel to be rendered, the interpolated offset vector is used to control the pixel moving mechanism to read the correct frame-buffer value corresponding to the refracted transmitted light.

In this scheme it is the responsibility of the system software (either application or application program interface) to provide the proper offset vectors and it is the responsibility of geometry processor 101 to transform the offset vectors in response to changes in the geometric transformation matrix being applied to the object.

In the example shown in FIG. 3, the offset vectors are such to point somewhat to the right. The offset vector points in the direction of the bending incurred through refraction. As triangle 302 is rendered, for a given pixel on the triangle pixel data from a pixel located to the right of the given pixel is read and blended with the data from the given pixel. Although the light we are interested in is travelling in a direction opposite to that shown in FIG. 3b, the construction is valid because the reversibility of the geometry and physics is exploited.

The advantage of this method, treating refraction as a surface property, is that it is fast and simple, however, it requires explicit processing by the host processor 100 and geometric processor 101 to calculate and transform the offset vector. Inaccuracies occur because of the approximation of modeling refraction as a surface phenomenon. Refraction is actually a bulk phenomenon requiring some knowledge of material thickness and surface normals before it can be accurately approximated for more complicated objects.

Second solution (additional accuracy but slower performance)

Figure 4:
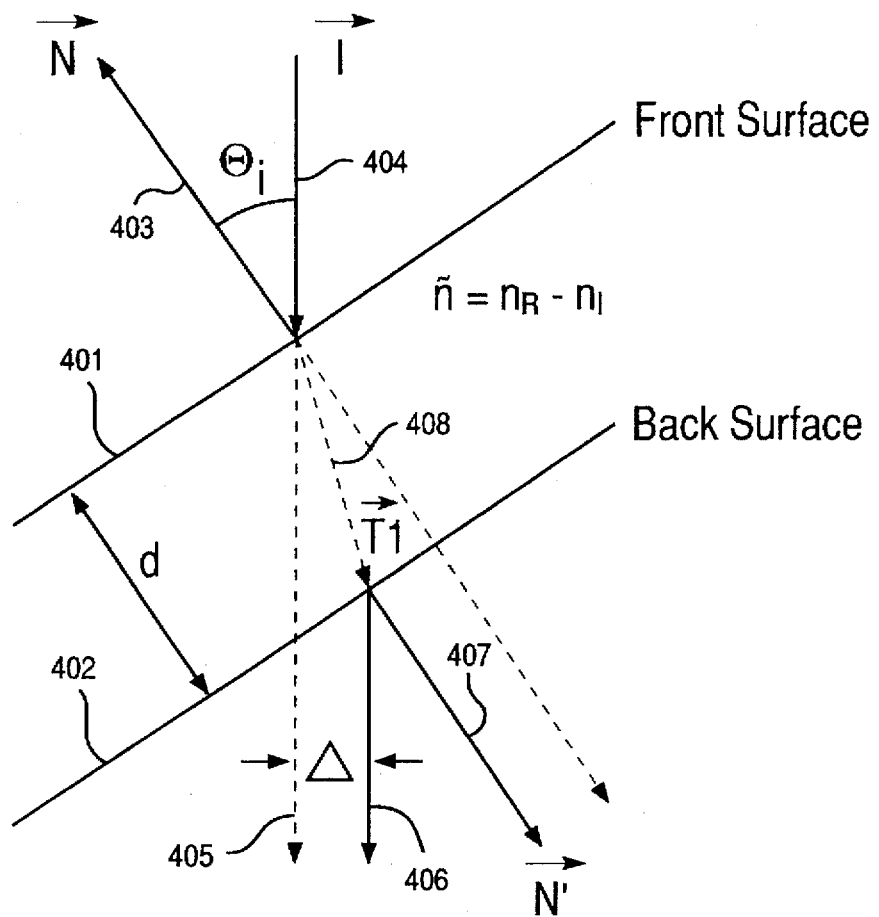
FIG. 4 depicts a ray incident on an object in which refraction is present.

In this embodiment some performance is sacrificed to more accurately model the refraction by accounting for the thickness of the transmitting object. A side view of the configuration is presented in FIG. 4. The two surfaces of the object 401 and 402 are assumed to be parallel, however the object thickness need not remain constant from surface patch to surface patch. Although physically contradictory assumptions, satisfactory visual effects are possible with such an approximation.

The method for determining the appropriate offset vectors is now accomplished via the following steps:

- Sort the triangles of the object from back to front. This operation is performed by either host processor 100 or geometry processor 101 or some combination of the two.
- Render the back facing polygons (triangles) into a Z-buffer, typically located in DRAM 105.

The first two steps can be accomplished by rendering the object twice, the first time only back facing triangles are rendered, the second time only the front facing. The PHIGS graphics programming interface provides facilities for such selective rendering. The result is to write triangle 402 (representing the back surface) into a Z-buffer.

- Render the front of the image while interpolating the transmitted vector 408. This interpolation takes the form of interpolating a 2-dimensional offset-vector 501. See FIG. 5. Vector 408 is computed using equation (2). The geometric processor can compute a vector 408 for each vertex and these can then be interpolated to provide the vector 408 used for a given pixel on a front facing triangle 401 of the refractive object.
- For a given pixel on a front face triangle 401, interpolate along the projection (501) of the transmitted vector 408 onto the XY plane. For each pixel along the projected vector perform a comparison of the interpolated Z value with the Z value previously rendered into frame buffer 103. When the interpolated Z value equals, within a given epsilon, the value in the frame buffer, stop interpolating and use the color of the current pixel as the color to blend. This is the point where vector 408 intersects the previously rendered surface 402.

Figure 5:
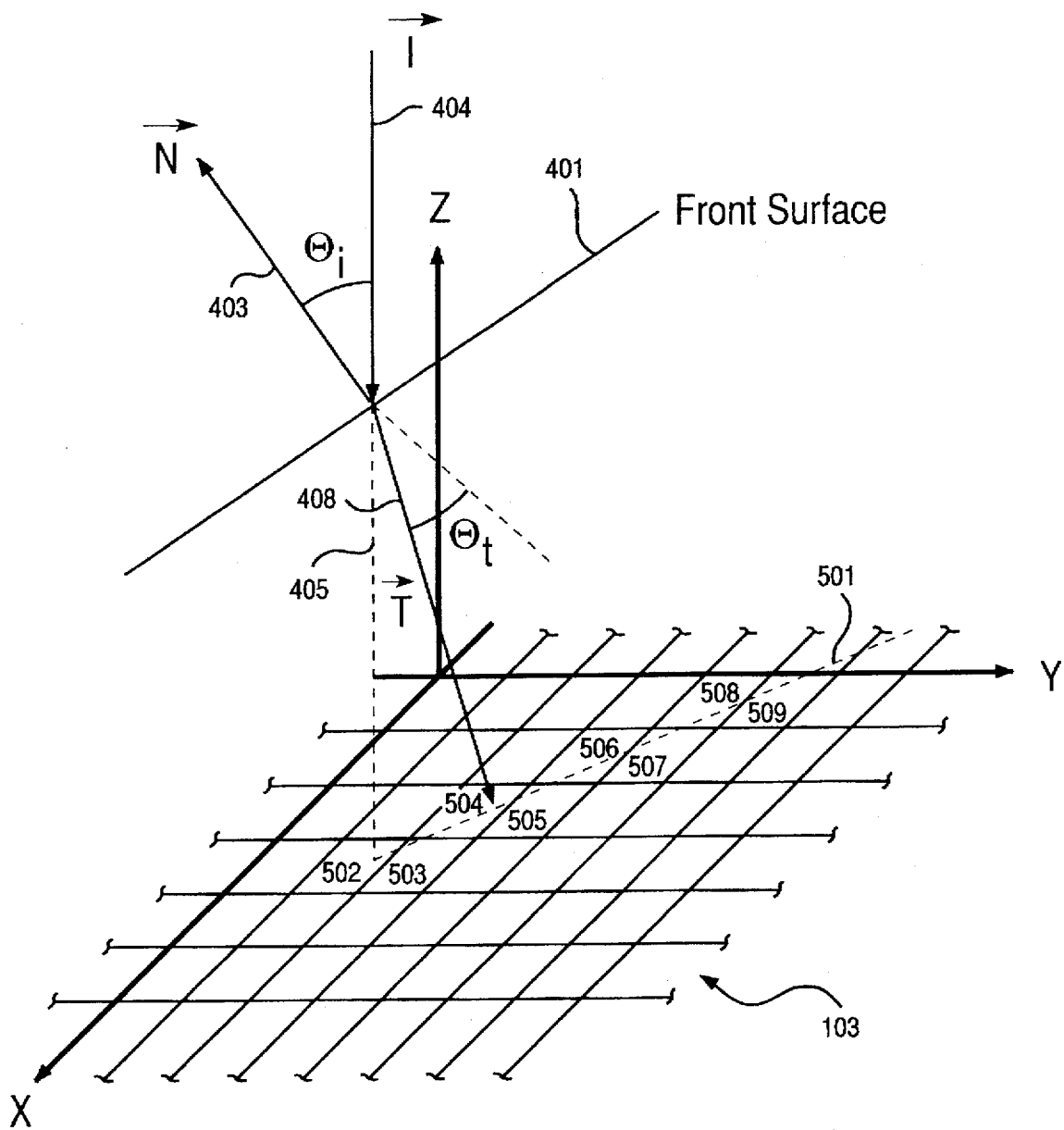
FIG. 5 depicts the geometry involved in computing the offset vector.
Figure 7:
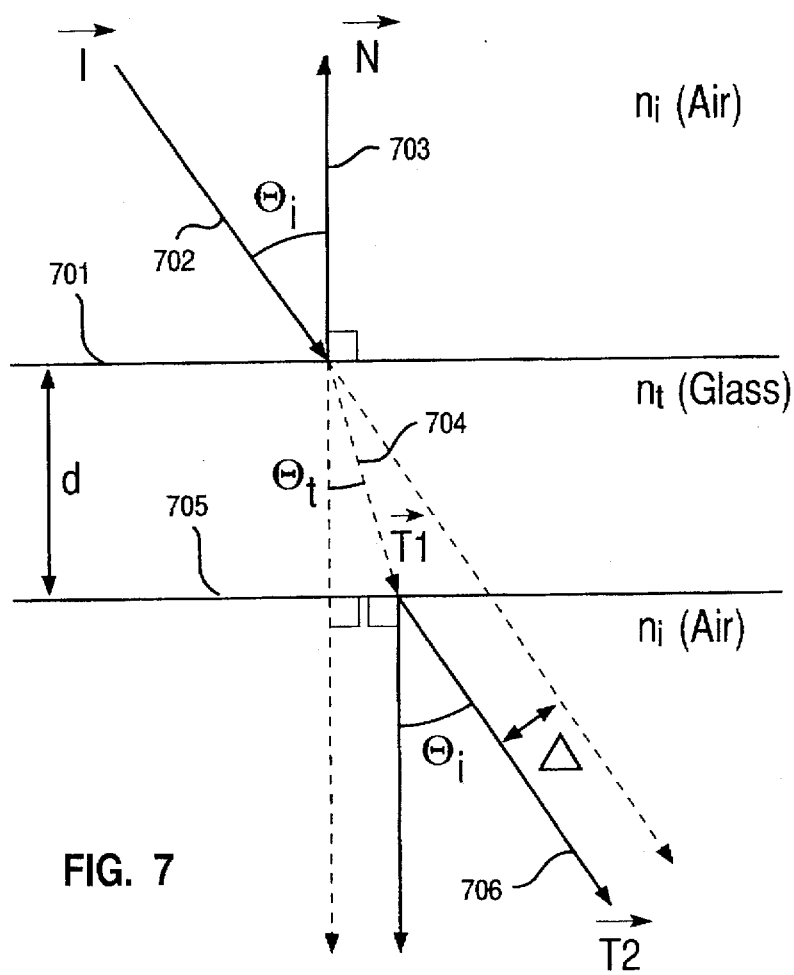
FIG. 7 presents the relevant geometry for refraction occurring in a glass slab situated in air.
Figure 8:
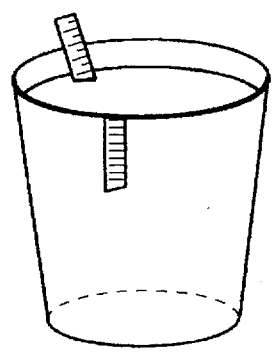
FIG. 8 illustrates the effect of refraction in an everyday scene.

The projection operation is depicted in FIG. 5. The projection 501 is followed from pixel 502 along to 503, 504, etc. For each pixel 502, 503, 504, . . . the value in the Z-buffer (part of frame buffer 103) is compared with the interpolated Z value. The interpolation process is continued until the interpolated value equals within a given epsilon the Z-buffer value or until the edge of the active window is reached. The latter termination criterion prevents infinite searches. One cause of this condition is when a pixel is obstructed as discussed below. For the configuration in FIG. 5 the interpolated Z value for the transmitted vector 408 equals the Z-buffer value at pixel 504. Thus pixel 504 represents the position at which the transmitted vector 408 intersects the back surface 402 of the transmitting object.

A potential problem exists when refraction through an object causes an otherwise occluded object to become visible. For example., if a thin cylinder is situated in front of a plane and a refractive material is next to the cylinder then pixels directly behind the cylinder may be visible through the refractive material. In this situation, the color information needed for the refracted ray is not available. Some neutral background color can be selected or the color of the adjacent pixel along the interpolated projected vector can be used. The appropriate action to mitigate this problem depends on the circumstances. Therefore, the current invention allows for a user selectable action when a pixel's information is not available.

Third solution (most accurate but slowest performance)

The third embodiment is an improvement in accuracy over the second in that the restriction of parallel front and back object surfaces is lifted. The object's geometry is unconstrained and the object may vary in thickness and surface normal.

The process to compute the refraction begins with the same three steps as the second alternative method above.

● Sort the triangles of the object from back to front.

● Render back facing polygons (triangles) into a spare Z-buffer and frame-buffer storing the normals.

● Render the front facing triangles and interpolate the transmitted vector 408. Interpolate along the projection 501 of the transmitted vector onto the XY plane. For each pixel along the projected vector perform a comparison of the interpolated Z value with the Z value in the frame buffer. When the interpolated Z value exceeds the value in the frame buffer then stop interpolating.

(The previous steps are the same as for the second solution methodology discussed previously.)

● Compute the vector transmitted out of the refractive media back into the surrounding medium 406. This calculation is done using an approximation of the equation for the transmitted vector given in equation (2). Interpolate along the projection of transmitted vector 406 again comparing interpolated Z values with Z values read from the corresponding Z-buffer location. Upon reaching a Z crossing read the color in the frame buffer. If the edge of the active window is reached before an object is found use a previously assigned ambient color. The value found (or ambient color) is then used in the final blend.

Although the current invention has been described as part of a system containing a geometry processor front-end, this has been for illustrative purposes only. There is no requirement that an explicit geometry processor be present. Any single means for limited calculations is sufficient computational apparatus.

The mechanism for providing arbitrary pixel movements can readily be utilized in other applications, for example image processing. Although we have considered the phenomenon of refraction in an isotropic homogeneous medium, the concepts can be generalized to more complicated optical physics such as anisotropic media.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A system for generating a two dimensional representation of a plurality of three dimensional objects, at least one of said plurality of objects being a refractive object having a non-unity index of refraction, the system comprising:

means for generating an offset vector for each pixel of said at least one of said plurality of objects having a non-unity index of refraction by interpolation based on said index of refraction;

means for rendering each of said plurality of objects, object by object, wherein said refractive object is rendered by determining for each pixel position of said refractive object a current pixel value by modifying said current pixel value by a second pixel value located at a second pixel position offset from said current pixel position by a displacement of said offset vector, said means for rendering having:

means for rendering said objects from the farthest from a viewpoint to the nearest;

means for dividing said refractive object into a plurality of polygons for rendering;

means for ordering said plurality of polygons from the farthest from a viewpoint to the nearest;

means for rendering said ordered polygons to create a back surface of said refractive object;

means for rendering polygons nearest said viewpoint wherein pixel data from said rendered polygons is combined with pixel data from said nearest polygons based on said offset vector.

2. The system of claim 1, further comprising means for projecting said offset vector onto an x-y plane and means for determining a point on said vector where said vector intersects the plane of said back surface.

3. A system for rendering two dimensional images of three dimensional objects on a display device, said display device comprising a plurality of pixels organized as a plurality of rows having a plurality of column positions, said three dimensional objects including at least one refractive object having an index of refraction other than unity, the system comprising:

storage means for storing data representative of each of said three dimensional objects;

frame buffer means for storing data representative of said two dimensional image, said frame buffer containing a storage location corresponding to each of said plurality of pixels;

means for interpolating an offset vector for each of said plurality of pixels of said at least one refractive object indicative of said index of refraction of said refractive object;

rendering means for determining a value for each of a plurality of pixels in each of said three dimensional objects, said rendering means rendering object by object, said rendering means modifying said pixel value based on a second pixel value at a second pixel location indicated by said offset vector for each of said plurality of pixels of said at least one refractive object, wherein said rendering means determines said second pixel location by projecting said offset vector onto the X-Y plane and testing an interpolated depth value against a depth value of a previously rendered polygon surface, and selecting said second pixel position where said depth values match.

4. The system of claim 3, further comprising:

means for computing a transmitted vector out of said refractive object;

means for interpolating along said transmitted vector until said transmitted vector intersects a rendered polygon; and selecting a pixel value at said intersection for combining with said current pixel.

5. A method of rendering a two dimensional image of an object representing a material having a non-unity index of refraction, the object being represented by a plurality of polygons in three dimensions, each having a plurality of vertices, the method comprising the steps of:

associating an offset vector representing a refractive effect with each of said vertices;

ordering the plurality of polygons by displacement from a viewpoint from a deepest back-facing polygon to a nearest front-facing polygon;

rendering the polygons;

rendering the polygons a second time while interpolating the offset vector and blending with a current image pixel a second pixel indicated by the interpolated vector.

6. The method of claim 5, wherein the interpolation performed by said step of rendering the polygons a second time is accomplished by projecting the offset vector until said projection crosses one of said previously rendered polygons.

7. The method of claim 9, further comprising the steps of:

computing a vector transmitted out of said object into a surrounding medium;

interpolating said transmitted vector until it crosses one of said rendered polygons;

rendering said pixels by combining data from said original and interpolated pixel positions.

8. The method of claim 5, further comprising the steps of:

computing a vector transmitted out of said object into a surrounding medium;

interpolating said transmitted vector until it crosses one of said rendered polygons;

rendering said pixels by combining data from said original and interpolated pixel positions.

* * * * *